United States Patent [19]

Groeneweg

[11] Patent Number: 4,671,439
[45] Date of Patent: Jun. 9, 1987

[54] LUGGAGE CARRIER APPARATUS FOR A VEHICLE

[76] Inventor: Ronald L. Groeneweg, 232 6th Ave., SE., Sioux Center, Iowa 51250

[21] Appl. No.: 817,050

[22] Filed: Jan. 8, 1986

[51] Int. Cl.⁴ .............................................. B60R 9/06
[52] U.S. Cl. ..................... 224/42.03 A; 224/42.03 R
[58] Field of Search ............... 224/42.03 A, 42.03 R, 224/42.07, 42.08, 42.42, 42.43, 42.44, 42.32, 42.04, 42.05, 310; 292/256, 256.5, 56, 11; 296/37.1, 37.6; 280/769

[56] References Cited

U.S. PATENT DOCUMENTS

| | | | |
|---|---|---|---|
| 193,321 | 7/1877 | Coffin | 292/256 X |
| 1,691,804 | 11/1928 | Hanson | 224/42.32 X |
| 1,811,489 | 6/1931 | Blakely | 224/42.43 |
| 1,849,046 | 3/1932 | Arndt | 224/42.43 |
| 3,202,332 | 8/1965 | Walker | 224/42.08 X |
| 3,334,761 | 8/1967 | Perri | 224/42.08 X |
| 3,471,070 | 10/1969 | Olson | 224/42.04 |
| 3,731,860 | 5/1973 | Davis | 224/42.03 A X |
| 3,912,098 | 10/1975 | Nicotra | 224/42.04 X |
| 3,999,693 | 12/1976 | Cooper, Sr. | 224/42.03 A |
| 4,089,554 | 5/1978 | Myers | 224/42.03 A X |
| 4,320,862 | 3/1982 | Bettenhausen | 224/42.03 A |
| 4,384,663 | 5/1983 | Smith-Williams | 224/42.31 |
| 4,570,986 | 2/1986 | Sams | 224/42.03 A X |

FOREIGN PATENT DOCUMENTS

| | | | |
|---|---|---|---|
| 245177 | 2/1926 | Italy | 224/42.03 A |
| 300560 | 9/1932 | Italy | 224/42.03 A |

Primary Examiner—Stephen Marcus
Assistant Examiner—Robert M. Petrik
Attorney, Agent, or Firm—Henderson & Sturm

[57] ABSTRACT

Luggage carrier apparatus of a type which has a container connected to the back of a mini-van or the like. A lid is provided for the container and the lid pivots rearwardly so that it will not come in contact with the rear of the van during the pivoting process. Special latches and locking mechanisms are provided to ensure that the luggage carrier lid will not open while the mini-van is moving and to prevent unauthorized access thereto. A special mounting apparatus is provided for telescopingly connecting the luggage carrier to the van to make it easily attachable to or removable from a mini-van by authorized personnel, but difficult to remove by unauthorized persons.

10 Claims, 10 Drawing Figures

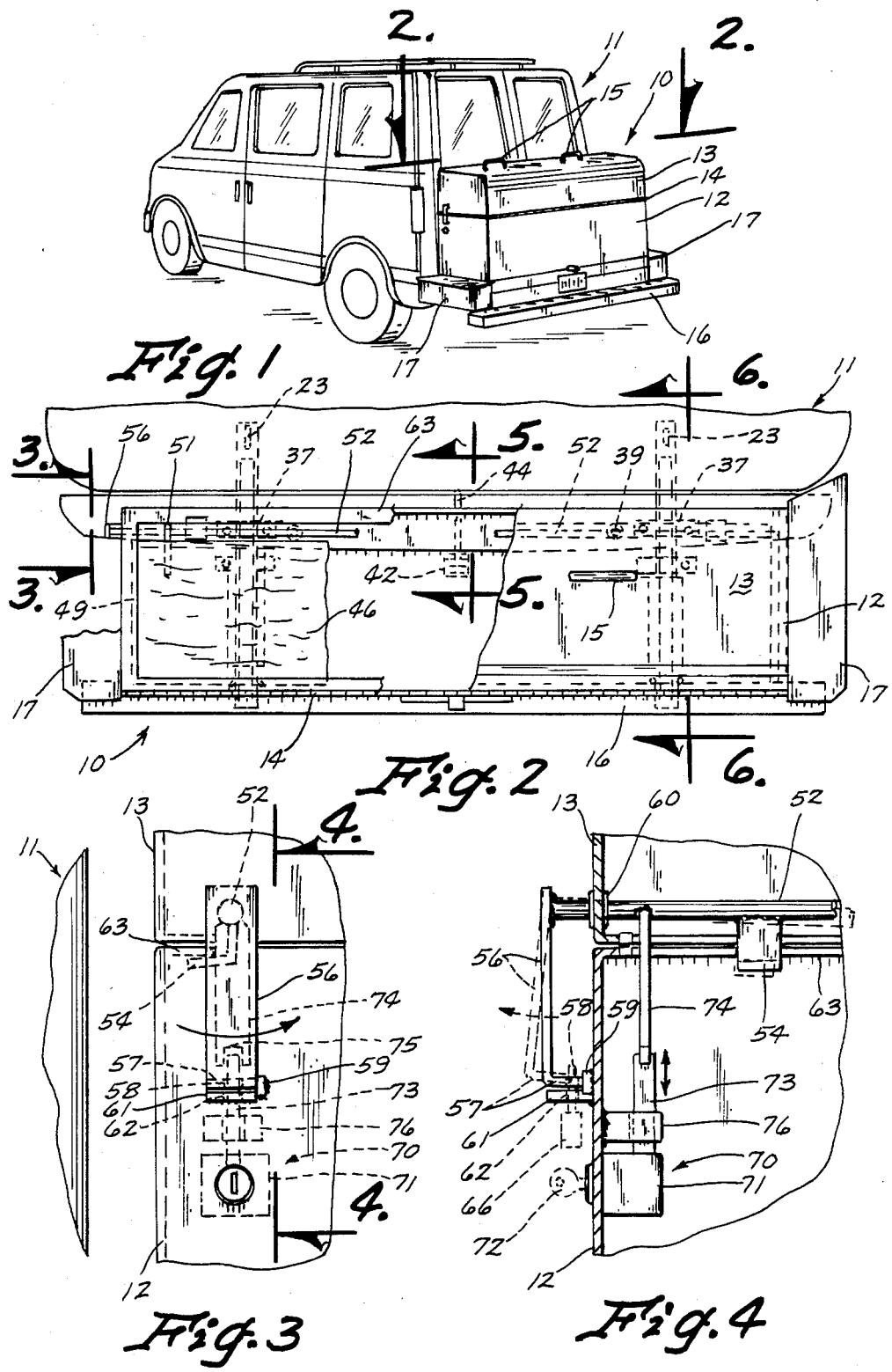

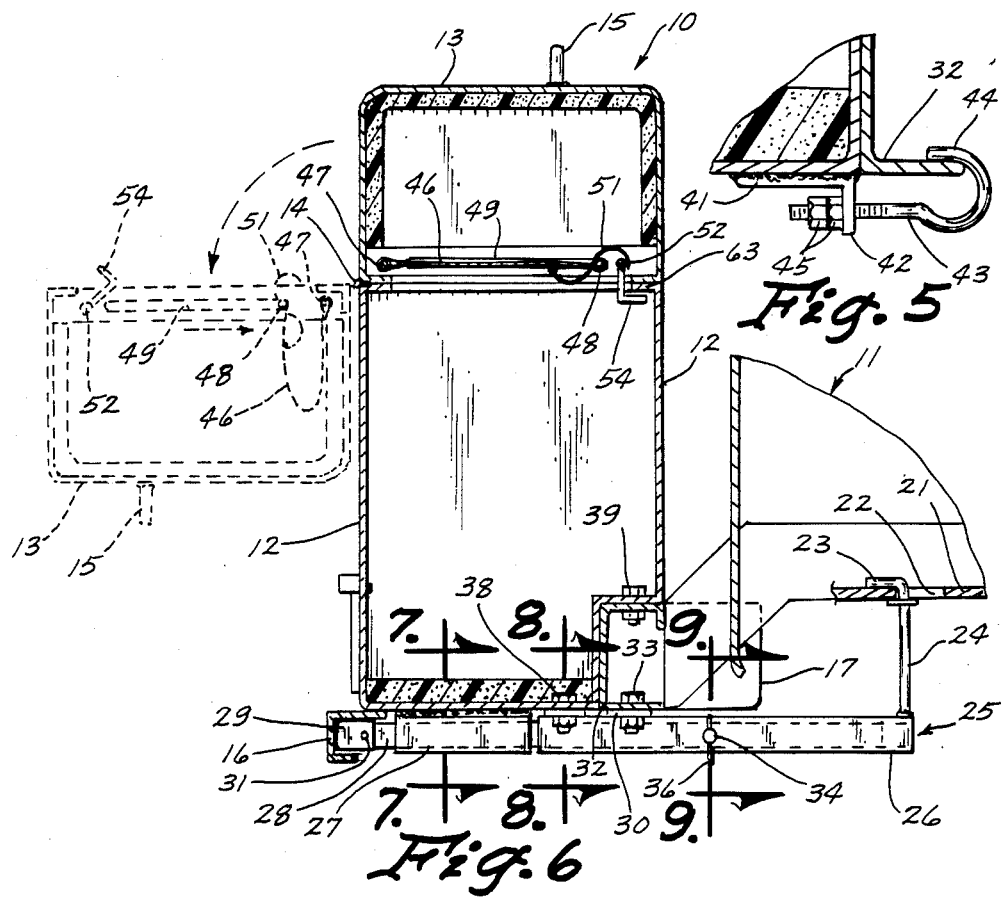

LUGGAGE CARRIER APPARATUS FOR A VEHICLE

TECHNICAL FIELD

The present invention relates generally to luggage carriers and more particularly to a luggage carrier which mounts to the rear of a vehicle.

BACKGROUND ART

In recent years auto manufacturers have begun to produce vans which are considerably smaller than vans produced during the previous decade or so. These new smaller vans are commonly referred to as "mini-vans". These mini-vans typically are filled with seats so that as many people as possible can travel in them comfortably. A problem with these mini-vans is that there is no provision for storing luggage when the van is full of people.

It is well known that luggage carriers are commercially available for attachment to the top of a car or van, but such car top carriers are not practical for mini-vans because such mini-van is so high that access to the luggage within such a luggage carrier is extremely difficult. Consequently, there is a need for a different type of luggage carrier for a mini-van or the like which will provide adequate luggage storage space and still be readily accessible.

DISCLOSURE OF THE INVENTION

The present invention relates to a luggage carrier apparatus of a type which has a container connected to the back of a mini-van or the like. A lid is provided for the container and the lid pivots rearwardly so that it will not come in contact with the rear of the van during the pivoting process. Special latches and locking mechanisms are provided to ensure that the luggage carrier lid will not open while the mini-van is moving and to prevent unauthorized access thereto. A special mounting apparatus is provided for telescopingly connecting the luggage carrier to the van to make it easily attachable to or removable from a mini-van by authorized personnel, but difficult to remove by unauthorized persons.

An object of the present invention is to provide an improved luggage carrying apparatus for mounting to the exterior of a vehicle.

Another object of the present invention is to provide a luggage carrier of the aforementioned type which will mount to the back end of a vehicle to provide ready access thereto.

Another object of the present invention is to provide a luggage carrier of the aforementioned type which opens rearwardly so that the lid will not bump the back of the vehicle.

A still further object of the present invention is to provide a novel latching system for a luggage carrier of the aforementioned type.

A still further object of the present invention is to provide a mounting system for a luggage carrier apparatus so that the luggage carrier can be readily attached to or removed from a vehicle easily by authorized personnel.

Other objects, advantages, and novel features of the present invention will become apparent from the following detailed description of the invention, when considered in conjunction with the accompanying drawings.

BRIEF DESCRIPTION OF THE DRAWINGS

FIG. 1 is a perspective view of a preferred embodiment of the present invention connected to the rear of a mini-van;

FIG. 2 is a top view of the preferred embodiment of the present invention taken along line 2—2 of FIG. 1 and having portions thereof broken away to show the interior thereof;

FIG. 3 is an enlarged cross-sectional view taken along line 3—3 of FIG. 2;

FIG. 4 is an enlarged cross-sectional view taken along line 4—4 of FIG. 3;

FIG. 5 is an enlarged partial cross-sectional view taken along line 5—5 of FIG. 2;

FIG. 6 is a cross-sectional view taken along line 6—6 of FIG. 2;

FIG. 7 is an enlarged partial cross-sectional view taken along line 7—7 of FIG. 6;

FIG. 8 is an enlarged partial cross-sectional view taken along line 8—8 of FIG. 6;

FIG. 9 is an enlarged partial cross-sectional view taken along line 9—9 of FIG. 6; and FIG. 10 is a perspective view of step structures which are connected to the ends of the luggage carrier so that a person can step up on such structures and have ready access to the interior of the luggage carrying apparatus of the preferred embodiment shown in FIG. 1.

BEST MODE FOR CARRYING OUT THE INVENTION

Referring now to the drawings, wherein like reference numerals designate identical or corresponding parts throughout the several views, FIG. 1 shows a luggage carrier (10) connected to a mini-van (11). The luggage carrier (10) includes a bottom container portion (12) and a top lid portion (13) hingedly connected to the container (12) by a hinge (14). Still referring to FIG. 1, it is noted that a rear bumper (16) is attached to the rear bottom portion of the container (12) and steps (17) are attached to the sides of the container (12) and to the van (11) so that a person can step up onto the step (17) and have ready access to the interior of the container (12) when the lid (13) is open.

Referring now to FIG. 6, it is noted that the frame (21) of the van (11) has an opening (22) therein for receiving an end (23) of a shaft (24). The bottom end of the shaft (24) is welded to a tubular member (26) as can readily be seen in FIGS. 6 and 9.

The bottom wall of the container (12) has a pair of members (27) welded thereto for slidably receiving a smaller tubular member (28) which has the bumper (29) attached thereto by means of a pin (31). Two of the mounting assemblies (25) as shown in FIG. 6 are utilized, one on each side of the van in alignment with a corresponding frame member (21) of the van (11). In order to attach the apparatus (10) to the van (11) by using the assemblies (25), the assemblies (25) are attached first to the van by inserting the member (23 and 24) through the opening (22) as shown in FIG. 6 and then bolting a flange (30) to the bottom of the bumper (32) of the frame by use of nut and bolt assemblies (33). The flange (30) is preferably welded to the tubular member (26).

The second tubular member (28) is then placed through each respective one of the members (27) on the bottom of the luggage carrier apparatus (10) with the bumper (29) attached thereto. The other end of the member (28) is then inserted through the members (26) until the luggage carrier (10) is in the position shown in solid lines in FIG. 6. At this time, a pin (34) is placed through the openings in tubular members (26 and 28), as shown in FIG. 9, and a securing spring member (36) is utilized to keep the pin (34) from falling out of the holes and keeping it in the position shown in FIG. 9. Additionally, the bottom of the container (12) is bolted to a plate (37) by utilizing nut and bolt assemblies (38) which extend through the plate (37), the plate (37) being welded to the tubular member (26), and having holes in alignment with holes in the bottom of the container (12). Additional nut and bolt assemblies (39) extend through another portion of the container (12) and through aligned openings therein and in the bumper (32) as can best be seen in FIG. 6.

In the center front portion of the container (12), on the bottom thereof, an L-shaped member (41) is welded to the bottom of the container (12) and has an opening in one end (42) thereof for receiving a hook member (43) which has an end (44) extending over the bumper (32). Threaded nut fasteners (45) permit the hook (43) to be tightened down to secure the center bottom portion of the container (12) against the bumper (32).

Referring again to FIG. 6, it is noted that the lid (13) is pivotally attached to the container (12) on the rear side of each one respectively so that the lid (13) will pivot away from the van (11) so that the lid (13) does not bump the back of the van (11). Referring to FIG. 6, it is noted that a flexible canvas member (46) is attached to a rod (47) across one portion of the lid (13) adjacent to the hinge (14). The other end of the flexible canvas member (46) is attached to a rod (48) which slides in grooves (49) (FIG. 2) so that the canvas (46) can be moved to the position shown in solid lines in FIG. 6 to keep things stored within the lid (13) or, alternatively, the canvas can be moved to the position shown in dashed lines in FIG. 6 for opening it up to load cargo or luggage therein. Hooks (51) extend through the canvas (46) and can be hooked around the flexible rod (52) as shown in solid lines in FIG. 6. Preferably there is a hook (51) at each end of the canvas (46) and one in the center of the canvas which extend around the rods (48) and can selectively extend around the flexible shaft (52) when it is desired to keep the canvas closed tight.

The latching structure of the preferred embodiment of the present invention utilizes a flexible shaft (52) which is pivotally mounted through the ends of the lid (13) for example, as shown in FIG. 4. This flexible shaft (52) is preferably made of steel. A plurality of L-shaped members (54) are welded at one end thereof to the flexible shaft (52) along the length thereof. One end of the flexible shaft (52) has a lever (56) welded thereto and this lever (56) has a right angle portion (57) on the other end thereof with an opening (58) extending therethrough. A friction engaging member (59) is welded to one end of the sidewall of the container (12) and a member (61) is welded to the sidewall just under the member (59) and has an opening (62) therein which will be in alignment with the opening (58) in the lever portion (57) when the lever (56 and 57) is in the position shown in FIGS. 3 and 4.

When the lever (56) is in the position shown in FIG. 3, it is noted that the L-shaped members (54) extend under a lip (63) on the top front portion of the container (12). When the L-shaped members (54) are in this position, the lid is securely held closed. When the handle (56) is pivoted in a counter-clockwise direction as viewed from FIG. 3, it will move the lever (54) to the position shown in dashed lines in FIG. 6, which will prevent the L-shaped member (54) from contacting the lip (63) and the lid (13) can be pivoted from the position shown in solid lines in FIG. 6 to the position shown in dashed lines in FIG. 6.

Referring now again to FIGS. 3 and 4, it is noted that a padlock (66) can be utilized to extend through the openings (58 and 62) when the lid (13) is closed and the handle (56) is in the position shown in FIGS. 3 and 4. This will hold the handle (56) in the position to keep the lid (13) closed while the van is travelling, and will at the same time prevent unauthorized access thereto when the van is stopped and unattended.

Additionally, a key operated locking system (70) can be utilized additionally or in conjunction with the padlock (66). This key operated system includes a conventional unit (71) which can be turned by a key (72) to move a member (73) up or down, depending upon the position of the key (72). When the member (73) is moved upwardly, and the handle (56) is in the position shown in FIG. 3. A lever (74), rigidly welded to the flexible shaft (52) and having a slot (75) in one end thereof will be in a position such that the member (73) will extend up into the slot (77). The key (72) can then be removed and the member (73) will remain in the slot (75) until the key is turned to lower the member (73) to the unlocked position. A supporting member (76) is welded to the side of the container (12) as shown in FIG. 4 to support the member (73) and permit it to slide up and down with respect to the support member (76). When the key operated system (70) is utilized, the padlock (66) is quite often replaced with a simple pin or bolt.

In operation, the luggage carrier apparatus (10) can easily be connected to the mini-van (11) by use of the mounting structures (25) shown in FIG. 6 and securing the unit against unauthorized removal by use of nut and bolt assemblies (38 and 39) while the lid (13) is open. Once the luggage carrier apparatus (10) is securely attached to the mini-van (11), the latching mechanism including flexible shaft (52) and L-shaped members (54) can be rotated by rotating the lever (56) from the locked position shown in solid lines in FIG. 3 in a counter-clockwise direction to unlock the latching mechanism and permit the lid (13) to be opened or closed. When it is desired to travel on the road, then a padlock (66) or a pin is inserted through the openings (58 and 62) to ensure that the lid (13) will not come open while the van (11) is moving. Additionally, if it is desired to lock the lid to prevent unauthorized access thereto when the van is stopped and left unattended, then the locking system (70) independently or in conjunction with the padlock (66) can be utilized as described above.

Obviously, many modifications and variations of the present invention are possible in light of the above teachings. It is therefore to be understood that, within the scope of the appended claims, the invention may be practised otherwise than as specifically described.

I claim:

1. a luggage carrier apparatus in combination with a vehicle having a rear bumper extending across the back of the vehicle wherein the carrier apparatus comprises:
   a container having a front wall, rear wall, sidewalls interconnecting the front and rear walls and a bottom wall interconnecting the front, rear and sidewalls together; wherein the sidewalls are provided with steps and the rear bottom portion of the container is provided with a rear bumper that is laterally displaceable with respect to the rear bumper of the vehicle;

a lid for said container, said lid comprising a front panel, a rear panel, side panels interconnecting said front and rear panels and a top panel interconnecting said front, rear and side panels;

hinge means for pivotally connecting the rear wall of said container with the rear panel of said lid; wherein the front panel of the lid may be pivoted away from the rear of the vehicle;

latch means attached to said lid and to the top of said front panel of said container for selectively holding the lid in a closed position;

locking means for selectively holding said latch means in a position to hold the lid closed; and means for connecting said container to the rear bumper of the vehicle, wherein the bottom of the container and the steps on the sidewalls of the container are attached to the rear bumper of the vehicle, such that a person may be supported by the steps in the process of gaining access to the interior of the container.

2. The luggage carrier apparatus of claim 1; wherein, said latch means comprises:

a flexible shaft pivotally attached through the lower front portion of the side panels of said lid;

an L-shaped projection rigidly attached to said flexible shaft;

lip means attached to a top portion of said front wall of the container for selectively receiving a portion of the L-shaped projection thereunder in one pivotal position of said felxible shaft;

a lever rigidly attached at one end thereof to one end of said flexibvle shaft outside of said lid and container;

friction means on one sidewall of the container adjacent to said lever for frictionally holding the other end of said lever outwardly from the lever's normal position with respect said one sidewall for bending said flexible rod in the elastic range thereof for causing the lever to frictionally engage said friction means when the lever is in a position corresponding to the latched position of said L-shaped member.

3. The luggage carrier apparatus of claim 2 wherein said lever has one portion thereof disposed normally parallel to said side panels and another section substantially perpendicular to said side panels;

a hole extending through said another section of the lever;

a projection disposed directly beneath said friction means attached to said one sidewall, said projection having an opening extending therethrough; and means for extending through the hole in the lever and the opening in the projection when said opening and hole are in alignment, corresponding to the latched position of said latch means.

4. The luggage carrier apparatus of claim 3 wherein said extending means is a padlock and comprises said locking means.

5. The luggage carrier apparatus of claim 3 wherein said extending means is a pin.

6. The luggage carrier apparatus of claim 2 including:

a second lever rigidly attached to said flexible shaft located on the inside of said lid;

a key operated means attached to said one sidewall for selectively engaging and holding said second lever from pivoting when said first lever is in engagement with said friction means.

7. The luggage carrier apparatus of claim 1 wherein said connecting means comprises:

a first tube;

means for connecting the first tube to the frame of a vehicle;

a second elongated member operably attached to the wall of said container selectively received telescopingly within said first tube; and means for selectively holding the second elongated member within said first tube.

8. The luggage carrier apparatus of claim 7 including means for bolting the bottom wall of said container to said first tube.

9. The luggage carrier apparatus of claim 7 wherein said vehicle has a rear bumper and said connecting means includes nut and bolt means for threadably attaching said bumper to said container.

10. The luggage carrier apparatus of claim 9 wherein said connecting means comprises a hollow member rigidly attached to the bottom wall of said container and said second tube is telescopically disposed therein.

* * * * *